United States Patent [19]

Bourne et al.

[11] Patent Number: 4,872,905

[45] Date of Patent: Oct. 10, 1989

[54] METHOD OF PRODUCING NON-AGGLOMERATING SUBMICRON SIZE PARTICLES

[75] Inventors: Roy S. Bourne, Clearwater; Clarence C. Eichman, Indian Rocks Beach; William W. Welbon, Bellair, all of Fla.

[73] Assignee: The United States of America as represented by the United States Department of Energy, Washington, D.C.

[21] Appl. No.: 192,555

[22] Filed: May 11, 1988

[51] Int. Cl.[4] ............................................. C23C 15/00
[52] U.S. Cl. ............................ 75/0.5 C; 204/192.12; 437/96
[58] Field of Search ..................... 75/0.5 C; 437/96; 204/192.12

[56] References Cited

U.S. PATENT DOCUMENTS

| 4,472,513 | 9/1984 | Hammond et al. | 75/0.5 C |
| 4,523,971 | 6/1985 | Cuomo et al. | 204/192.12 |
| 4,533,382 | 8/1985 | Miura et al. | 75/0.5 C |
| 4,533,383 | 8/1985 | Miura et al. | 75/0.5 C |
| 4,544,468 | 10/1985 | Münz et al. | 204/192.12 |
| 4,576,725 | 3/1986 | Miura et al. | 75/0.5 C |
| 4,584,078 | 4/1986 | Nakanouchi et al. | 204/192.12 |
| 4,610,718 | 9/1986 | Araya et al. | 75/0.5 C |

Primary Examiner—Upendra Roy
Attorney, Agent, or Firm—Armand McMillan; James H. Chafin; Judson R. Hightower

[57] ABSTRACT

Submicron size particles are produced by using a sputtering process to deposit particles into a liquid. The liquid is processed to recover the particles therefrom, and the particles have sizes in the range of twenty to two hundred Angstroms. Either metallic or non-metallic particles can be produced, and the metallic particles can be used in "metallic inks".

24 Claims, 3 Drawing Sheets

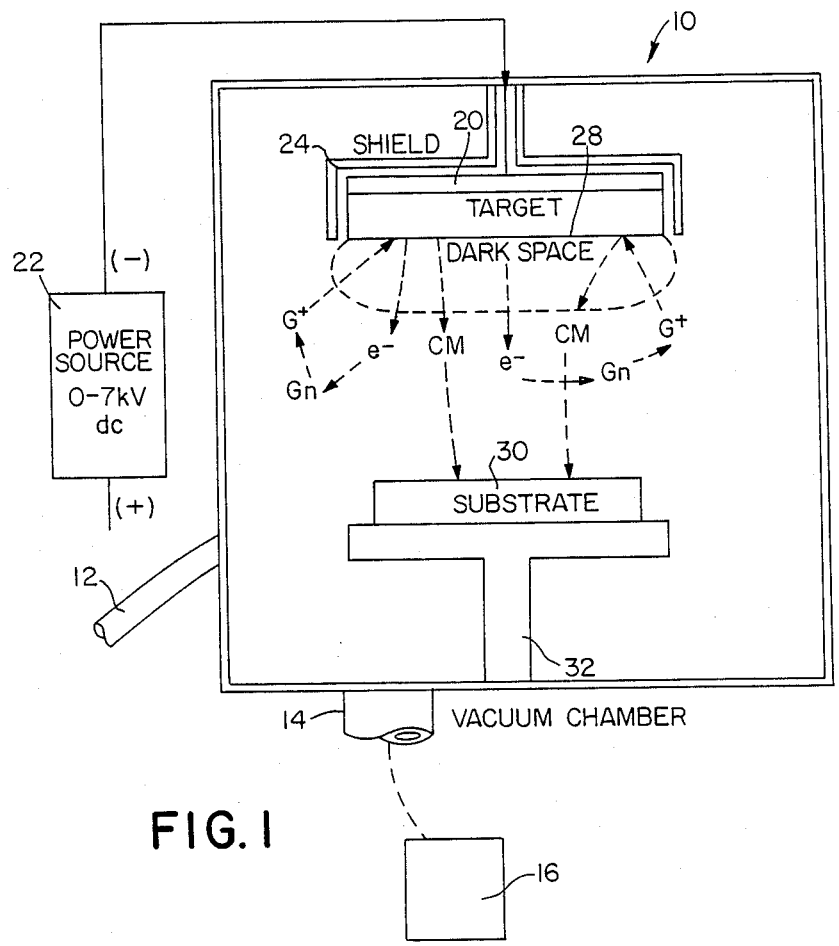
FIG. 1
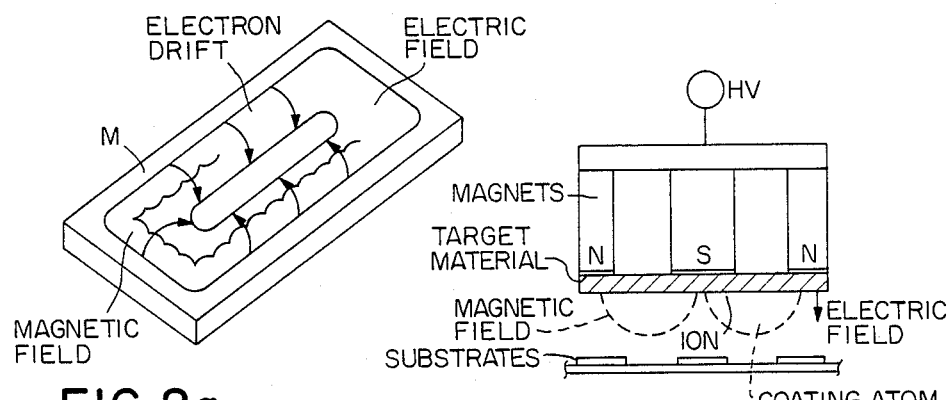
FIG. 2a
FIG. 2b

METHOD OF PRODUCING NON-AGGLOMERATING SUBMICRON SIZE PARTICLES

The U.S. government has rights in this invention pursuant to Contract No. DE-AC04-76DP00656 between the U.S. Department of Energy and the General Electric Company.

BACKGROUND OF THE INVENTION

1. Field of the Invention

The present invention relates, in general, to the art of forming particles, and in particular, to the art of forming very small particles. Specifically, the invention relates to the formation of particles having a size of less than one micron in diameter.

2. Description of the Prior Art

The art generally defines ultrafine particles (UFP) as being particles having a diameter in the range of one nm to about one hundred nm ($1 \times 10^{-9}$ m to about $1 \times 10^{-7}$ m). Such a particle is smaller than conventional fine powder and larger than a so-called atom cluster.

Ultrafine particles are of interest in the art because they have many applications. Examples of such applications include: production of powder catalysts, ceramics and electronics devices.

Specifically, ultrafine metallic particles have found use in the art of producing printed circuits and other such devices used in the construction of conductors, resistors, radiation and electrostatic shields which are required by many such devices. These applications of ultrafine particles use such particles in liquid suspension which is generally known in the art as "metallic inks".

Modern emphasis on miniaturization is dictating ever smaller and more precise detailing in these printed circuit components, and this has, in turn, spawned an industry of "micro-jet" printers which are controlled and guided by computers. Micro-jets spray very small globules of ink in the process of forming a component. It has been found that it is the size of the ink droplets that limits the miniaturization of the entire process because it is the size of the ink droplet that limits the size of the micro-jet sprayer.

Accordingly, there is a need for metallic inks having a droplet size that is as small as possible.

However, it is the size of the metallic particles that dictates the size of the ink droplets being sprayed. Accordingly, there is need for metallic particles that have a size smaller than the ultrafine particles presently used in the art.

The art presently has the capability to produce particles in the micron and submicron diameter sizes mentioned above with regard to the definition of ultrafine particles. For example, a Japanese project has produced such particles by a "smoke" process in which metals are vaporized into a low pressure gas, collected and then placed in liquid suspension. This process is limited to nonrefractory materials such as lead and gold and it is particularly dangerous to operate because of the high likelihood of a deflagration of the fine dry pyroforic powder produced. There is an acknowledged difficulty in capturing this dry powder and placing it in liquid suspension without re-agglomeration of the small particles into unusually large pieces. In addition, this is a rapid, high temperature process which is hard to control and which produces a wide range of particle sizes.

However, due to the just-discussed need for extremely small jets, even if the above-described drawbacks are overlooked these known processes still produce ultrafine particles that are too large for modern uses. Still further, such processes are not amenable to producing extremely small non-metallic particles.

Therefore, there is a need for a process that produces both metallic and non-metallic particles that are finer than the presently available ultrafine particles, yet does so in a manner that is safe and efficient.

OBJECTS OF THE INVENTION

It is a main object of the present invention to provide a process that produces particles having a size of less than one micron in diameter.

It is another object of the present invention to provide a process that produces either metallic or non-metallic particles having a size of less than one micron in diameter.

It is another object of the present invention to produce particles that can be used in metallic inks capable of having extremely small droplet sizes.

It is another object of the present invention to provide a process capable of producing extremely small particles in a manner that is not subject to deflagration or re-agglomeration of the particles.

It is a specific object of the present invention to provide a process that is capable of producing particles having a size in the range of twenty to two hundred Angstroms in diameter.

SUMMARY OF THE INVENTION

The above and other objects are achieved by providing a process which utilizes a sputtering technique to produce particles having sizes in the range of interest, and then capturing the particles produced on a substrate that is liquid instead of the usual metal or solid substrate used in conjunction with sputtering techniques. The process then recovers the particles captured in the liquid substrate and provides such particles for use in a wide variety of uses, which include, but are not limited to, the uses discussed above for ultrafine particles. One specific use is in the "metallic inks" discussed above.

Particles are sputtered from a target located in a vacuum chamber into a high molecular weight, low vapor pressure oil which serves as the substrate and is the collection medium. Control of the temperature of the collection medium is accomplished by shielding some of the secondary electrons from impinging on the oil bath by the use of a D.C. positive bias grid which is placed between the sputter target and the oil collection container. By an appropriate selection of sputtering techniques, e.g., D.C. or R.F., or the like, either metallic or non-metallic submicron particles can be produced and collected.

BRIEF DESCRIPTION OF THE DRAWINGS

FIG. 1 is a schematic indicating the general set-up of a sputtering technique used to coat a solid substrate.

FIG. 2a is a schematic representation of a magnetron element used in a magnetron sputtering process.

FIG. 2b is a schematic representation of a magnetron sputtering process in which particles are coated onto a solid substrate.

DETAILED DESCRIPTION OF THE PREFERRED EMBODIMENTS

Figure 3:
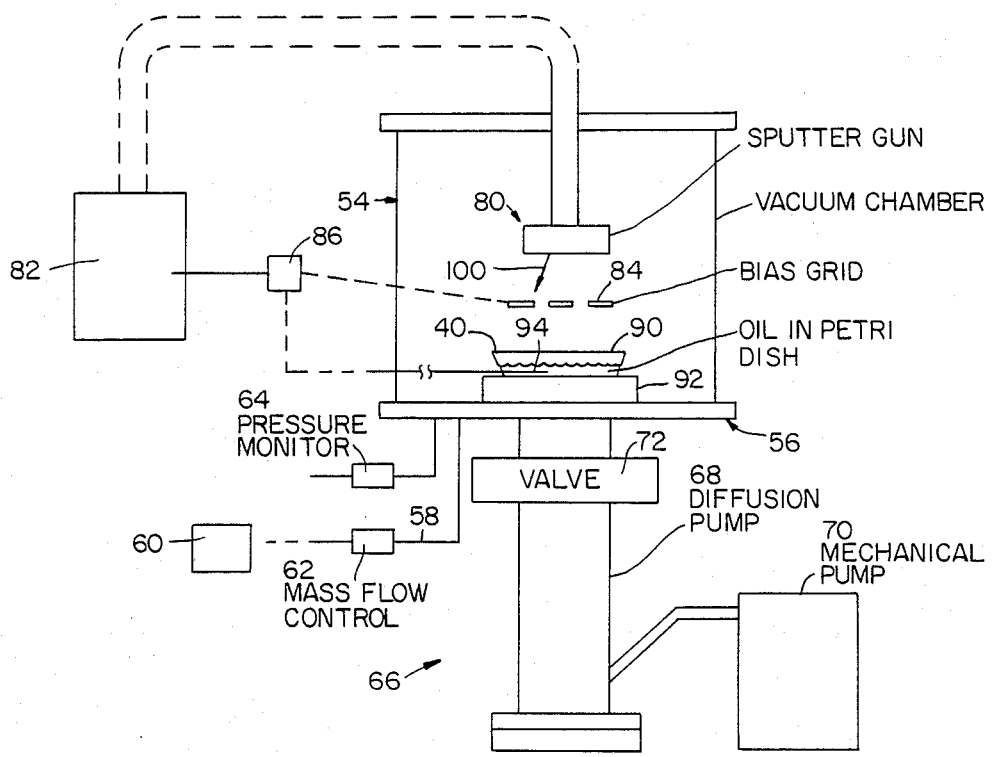
FIG. 3 is a schematic indicating the use of a sputtering technology to produce particles which are captured in a liquid according to the teaching of the present invention.

As required, detailed embodiments of the present invention are disclosed herein; however it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Shown in FIG. 1 is a schematic of a general sputtering technique used to coat solid substrates, such as metals or the like.

As used herein, the term "sputtering" denotes a process whereby atoms or clusters of atoms, charged or uncharged, are released from an electrode held at a negative potential, under the impact of positive ions which bombard it. The extent of the sputtering depends on a variety of factors—the energy of the bombarding ions, the molecular weight of the bombarding ions, the nature and condition of the cathode surface and the pressure in the inter-electrode space. The results can also be varied by altering the gas composition in the vacuum chamber in which the sputtering technique is carried out. For example, the usual gas is argon, and the addition of oxygen to this argon gas allows the process to become one of "reactive sputtering" to produce particles of oxides. Furthermore, by appropriately adding materials to the target electrode, the composition of the particles produced can be varied.

All of these factors can be varied to produce various results as will occur to one skilled in the art based on the teaching of the present disclosure. Accordingly, any such variation is intended to be encompassed within the purview of the present invention.

Referring now to FIG. 1, it can be seen that the sputtering technique is carried out in a vacuum chamber 10 having a gas inlet 12 which supplies the appropriate gas to the chamber from a source of such gas (not shown), and a gas outlet 14 which conducts the gas discharged from the chamber 10 to an appropriate collection means (not shown). Suitable vacuum pumping equipment 16 also connected to the vacuum chamber 10 to maintain the appropriate vacuum conditions within the chamber.

An electrode 20 is mounted in the vacuum chamber 10 and is connected to a power source 22 to be maintained at an appropriate potential thereby. The target electrode 20 is located within a shield 24 to have a dark space 26 adjacent thereto.

Also mounted in the vacuum chamber 10 is a substrate 30, which can be supported on an appropriate support 32.

As indicated in FIG. 1, the target electrode 20 is maintained at an appropriate potential with respect to the substrate 30 so that a potential difference exists across the space between the target electrode 20 and the substrate 30. The potential is set to establish a glow discharge condition and charges neutral gas ions, Gn, located between the target electrode 20 and the substrate 30 to form positively charged ions G+. Material is removed from the target electrode 20 by momentum transfer due to impact between these positively charged ions G+ and the target electrode 20 owing to the attraction of the positively charged ions G+ in the electrically energized plasma within the vacuum chamber 10.

The impact of the positively charged ions G+ dislodges very small particles CM, from the cathode material of the target electrode 10 with sufficient energy so that they are deposited on the substrate 30. Some electrons are dislodged from the target electrode 20 and can interact with the neutral gas material Gn as indicated in FIG. 1.

Cathode particles, CM, formed by the sputtering, strike the surface of the substrate 30 and coat that surface to form a film on that surface.

It is observed that there are a wide variety of sputtering techniques available to the art. Examples of such techniques are: diode techniques employing radio-frequency (r-f) or d-c sputtering, triode sputtering, laser sputtering, and the like. One example of a sputtering technique is shown in FIG. 2 in which a planar magnetron M defines a closed magnetic field loop to confine and encompass the plasma causing the ionized gas to sputter more efficiently. The electronic field, the electron drift and the magnetic field are indicated on magnetron M. Under the influence of the two fields, the electrons travel in a cycloidal path which is approximately perpendicular to the two fields, greatly increasing the efficiency of the ionization of the sputtering gas. The coating atoms and the like are also indicated in FIG. 2b.

Referring next to FIG. 3, the process embodying the present invention is shown. The elements of the FIG. 3 set up are similar to those shown in FIG. 2 with the major exception being the use of a liquid 40 as the substrate in place of the solid substrate shown in FIGS. 1 and 2b. Thus, the FIG. 3 set up includes a vacuum chamber 54 supported on a base means 56 and having plasma gas introduced thereinto via an inlet line 58 from a source of such gas 60. A mass flow control means 62 is also included in the inlet line 58, and a pressure monitor 64 is connected to the vacuum chamber 54. The pressure monitor 64 can provide feedback to a suitable control means to control process conditions within the vacuum chamber by adjustment of the mass flow control 62 and the vacuum valve 72 as required. The vacuum conditions within the vacuum chamber are maintained by means of a pumping arrangement 66 which includes a diffusion pump 68 and a mechanical pump 70 fluidically connected to the vacuum chamber and controlled by the control means associated with the vacuum valve 72.

The FIG. 3 set up includes a target electrode 80 which is connected to a power source 82 as was discussed above to create a sputtering process within the vacuum chamber 54. In the preferred embodiment of the present invention, the sputtering process is carried out using a magnetron set up. A bias grid 84 is also connected to the power source 82 via a control means 86 for a purpose to be discussed below. The control means 86 can be connected to the power source 82 and to the mass flow control means 58 as well as to the pressure monitor 64 and a temperature measuring means 90 which measures the temperature of the liquid 40 and vacuum valve 72 whereby all of the factors required to set the conditions of the process can be accounted for and used to control and set the process steps.

The liquid 40 is contained in a suitable container 90, such as a Petri dish, resting on a support 92. The Petri dish can be heated by a heater 94 to set a desired temperature of the liquid before the sputtering process is begun. In the preferred embodiment, the heater 94 is a quartz resistance heater, but any suitable heater can be used. The support 92 is designed so that it does not interfere with the vacuum pumping equipment, and the heater 94 is controlled to maintain proper oil temperature. Once the sputtering process is begun, however, the temperature of the liquid 40 is maintained by controlling the bias on the grid 84 to control the number of electrons bombarding the liquid. Accordingly, the bias grid 84 is maintained at a positive voltage with respect to the liquid 40; whereas the target electrode 80 is maintained at a negative potential with respect to the liquid 40. The temperature of the target may be controlled a circulating liquid therein.

Once the desired initial conditions of pressure, temperature and potential are established, the process is begun. The process is indicated in FIG. 4, and reference is now made to such figure.

The sputtering process is begun and carried out in the usual manner by establishing the potential between the liquid 40 and the electrode 80 to establish a glow discharge condition, ionizing the gas located between the target electrode 80 and the liquid 40. The charged gas ions impact the target electrode 80 to remove particles 100 from that target electrode. The particles 100 are coated by vapors from the oil which exist between the oil and the target electrode. These coated particles 100 strike the liquid 40 and are captured thereby.

The particles 100 captured by the liquid 40 are then recovered from that liquid and used as discussed above to make ink or in any other of the many uses which require submicron sized particles. It has been found that the particles 100 can have sizes in the twenty to two hundred Angsrtrom range which clearly places such particles in the submicron range. It is also observed that both metallic and non-metallic particles can be produced using appropriate sputtering techniques as will occur to those skilled in the art based on the teaching of this disclosure. As will also occur to those skilled in the art, changing various operating parameters, such as potential or current in the sputtering process can dramatically change the results of this sputtering process. Therefore, the process conditions should be set to produce the maximum number of usable particles in the most efficient manner.

Figure 4:
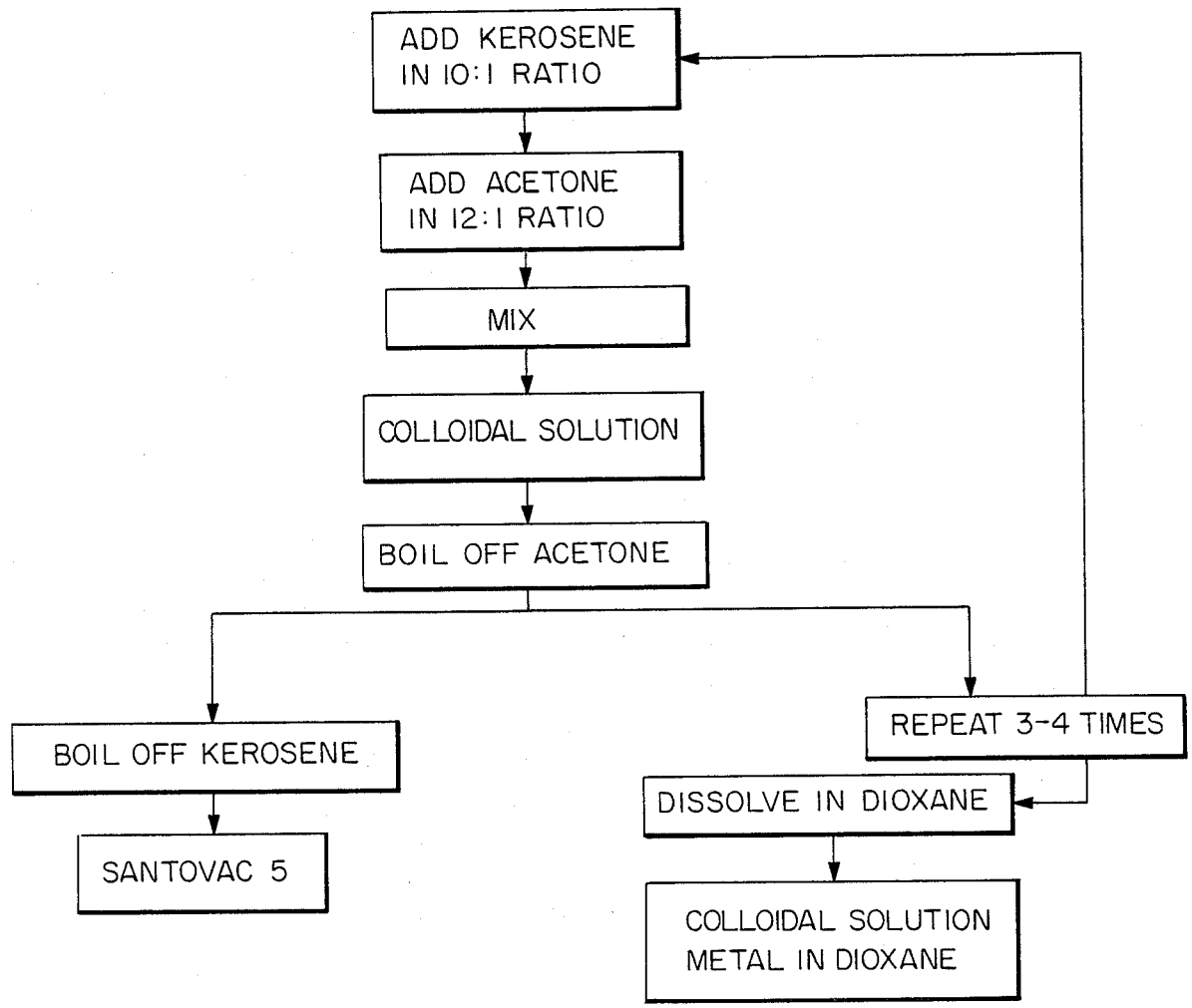
FIG. 4 is a flow diagram showing the steps in the process embodying the present invention.

The particles 100 are recovered from the liquid 40 according to a process outlined in FIG. 4. The liquid 40 is preferably a low vapor pressure, high molecular weight oil, such as a polyphenylether or the like. The oil should be capable of being used in the vacuum conditions existing in the vacuum chamber 54 with some evaporation but with no flashing so that the particles 100 will be coated before they reach the surface of the oil. In this manner, the particles will not be subject to burning when air is re-introduced into the system and will be prevented from agglomerating. The particles 100 will remain coated after they have been captured in the liquid 40 and even after the recovery process separates them from this liquid. One preferred example of the oil is sold under the trademark SANTOVAC 5.

The recovery process thus includes a step of mixing two solvents, such as kerosene and acetone, with the oil to thin out the oil/particle mixture and to form a colloidal solution. These solvents are mixed with the oil in the ratio indicated in FIG. 4.

The acetone is then removed by heat as its boiling temperature is lower than that of the kerosene/oil/metal mixture.

The solution which remains contains metal particles, oil, and kerosene in mixture; however, without the acetone, it is an unstable suspension and oil covered metal particles settle to the bottom. The oil-kerosene solution is decanted from the metal particles residue and each is separately reclaimed by boiling the kerosene from the oil.

The residue consists of metal particles, each coated with a layer of organic material produced by the heated oil in the sputtering process.

This separating process is repeated as necessary e.g., three or four times, to produced oil covered particles which remain as separate particles.

The oil covered particulate is typically used by dissolving the material in a solvent such as dioxane.

A preferred process includes the use of a target electrode which is gold and is a three inch diameter disc located five inches from the surface of the oil being used as the liquid 40. The target is maintained at a potential of negative seven hundred volts with respect to the oil, and the bias grid is maintained at a potential of positive thirty volts with respect to the oil, and is centrally located between the oil surface and the target electrode. A pressure of fourteen or less microns is maintained and argon gas is used in the vacuum chamber. A controllable flow rate of between seventy and one hundred fifty standard cubic centimeters per minute is established for the argon gas, and the oil is preferably the abovementioned SANTOVAC 5, and a sputtering current of approximately seven hundred milliamperes. Production rates of about ten grams of material per hour have been obtained using the three inch target electrode. The oil receiver preferrably is a shallow metal pan, about ten inches in diameter with oil therein being about 3/16 inches in depth. The bias grid is large enough to cover the oil receiver and is composed of a square grid of fine wires on ½ inch centers.

An alternative process uses a Tungsten target electrode in a d.c. magnetron sputtering technique. A silver or a lead electrode can also be used. Non-metallic electrode can also be used with an r-f magnetron or a laser sputtering process. The plasma can be xenon or the like and can include doping to change the characteristics of the particles. The oil container 90 is preferably metal for better heat transfer characteristics, but other materials can be used where suitable.

As discussed above, the submicron particles formed according to this inventive process are suitable for use in "metallic inks" and often have sizes in the range of less than five hundred Angrstoms in diameter.

It is to be understood that while certain forms of the present invention have been illustrated and described herein, it is not to be limited to the specific forms or arrangement of parts described and shown.

We claim:

1. A process for forming non-agglomerating metallic particles having a size of less than one micron in diameter, comprising:
   providing particles by a sputtering technique;
   capturing said particles in a high molecular weight low vapor pressure oil; and
   recovering the captured particles from the oil, said particles being covered with a molecular layer of oil that prevents agglomeration.

2. The process defined in claim 1 wherein the step of recovering the captured particles from the liquid includes adding a solvent to the liquid having the particles therein to result in a thinned mixture of liquid/particles.

3. The process defined in claim 1 wherein the steps of conducting the sputtering technique and capturing the particles are conducted in a vacuum chamber.

4. The process defined in claim 1 further including a step of processing the captured particles to form a metallic ink.

5. The process defined in claim 1 wherein the sputtering technique includes magnetron sputtering.

6. The process defined in claim 1 wherein the particles recovered have a size in the range of twenty to two hundred Angstroms in diameter.

7. The process defined in claim 1 wherein the step of recovering the captured particles from the liquid includes adding kerosene to the oil in an amount of about ten times the volume amount of oil to form a thin mixture.

8. The process defined in claim 1 further including a step of controlling the temperature of the liquid.

9. The process defined in claim 1 wherein the sputtering technique includes using a target electrode, and the process further includes forming the target electrode from gold.

10. The process defined in claim 1 wherein the sputtering technique includes using a target electrode, and the process further includes forming the target electrode from tungsten.

11. The process defined in claim 1 wherein the liquid is polyphenylether.

12. The process defined in claim 2 wherein the step of recovering captured particles from the liquid further includes adding a mixing agent to the thinned mixture of liquid/particles which causes the original liquid and the solvent to be uniformly mixed to form a uniform mixture containing the particles.

13. The process defined in claim 3 wherein the step of recovering captured particles form the liquid further includes removing the mixing agent and causing sedimentation of coated particles.

14. The process defined in claim 4 wherein the step of recovering the captured particles includes separating the solvent from the particles.

15. The process defined in claim 5 wherein the sputtering technique is conducted in an argon gas atmosphere.

16. The process defined in claim 7 wherein the step of recovering the captured particles from the liquid includes adding acetone to the thin mixture to make the oil, kerosene, acetone and particles to form a stable suspension.

17. The process defined in claim 8 wherein the sputtering technique produces electrons and the temperature of the liquid is controlled by controlling the number of electrons which contact the liquid.

18. The process defined in claim 15 further including establishing a vacuum pressure for the argon gas atmosphere of less than about fourteen microns.

19. The process defined in claim 17 wherein the step of recovering the captured particles from the liquid includes boiling off the acetone form the stable suspension and allowing the particles to separate with the particles falling to the bottom to form a particle precipitate and the oil, kerosene, and acetone rising to the top.

20. The process defined in claim 17 wherein the sputtering technique includes using a target electrode and the number of electrons contacting the liquid is controlled by establishing a secondary bias between the liquid and the sputtering target electrode.

21. The process defined in claim 17 wherein the step of controlling the temperature of the liquid includes heating the liquid by means of a quartz heater.

22. The process defined in claim 18 further including a step of flowing the argon gas through the vacuum chamber.

23. The process defined in claim 19 wherein the step of recovering the captured particles from the liquid includes decanting the oil, kerosene, and acetone off of the particle precipitate.

24. The process defined in claim 22 wherein the argon gas flow is held at between about seventy and one hundred fifty standard cubic centimeters per minute.

* * * * *